(12) United States Patent
Narula et al.

(10) Patent No.: US 11,496,857 B2
(45) Date of Patent: Nov. 8, 2022

(54) TRAVERSABLE DISTANCE BASED FEEDBACK REPORT TRIGGERING

(71) Applicant: QUALCOMM Incorporated, San Diego, CA (US)

(72) Inventors: Mohit Narula, San Diego, CA (US); Shuanshuan Wu, San Diego, CA (US); Shailesh Patil, San Diego, CA (US); Richard Reid Hovey, Branchburg, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 49 days.

(21) Appl. No.: 17/111,355

(22) Filed: Dec. 3, 2020

(65) Prior Publication Data

US 2022/0182782 A1 Jun. 9, 2022

(51) Int. Cl.
*H04W 24/00* (2009.01)
*H04W 4/02* (2018.01)
*G01C 21/34* (2006.01)
*G01C 21/36* (2006.01)
*H04W 8/24* (2009.01)
*H04W 24/02* (2009.01)

(52) U.S. Cl.
CPC ........ *H04W 4/023* (2013.01); *G01C 21/3407* (2013.01); *G01C 21/36* (2013.01); *H04W 8/24* (2013.01); *H04W 24/02* (2013.01)

(58) Field of Classification Search
CPC ....... H04W 4/023; H04W 8/24; H04W 24/02; G01C 21/3407; G01C 21/36
See application file for complete search history.

(56) References Cited

U.S. PATENT DOCUMENTS

2020/0314770 A1* 10/2020 Wu ..................... H04W 52/367
2021/0250118 A1* 8/2021 Roth-Mandutz ...... H04L 67/322

OTHER PUBLICATIONS

International Search Report and Written Opinion—PCT/US2021/072578—ISA/EPO—dated Feb. 22, 2022.
(Continued)

*Primary Examiner* — Erika A Washington
(74) *Attorney, Agent, or Firm* — Holland & Hart LLP

(57) ABSTRACT

Methods, systems, and devices for wireless communications are described. A first user equipment (UE) may receive, from a second UE, a first control signal indicating a range value corresponding to a threshold distance for triggering feedback reporting from the first UE for transmissions from the second UE. The first UE may calculate a traversable distance corresponding to a traversable route between the first UE and the second UE, determine, based on the calculated traversable distance and the range value, whether the first UE is within the threshold distance for triggering feedback reporting, and perform, based on whether the first UE is within the threshold distance, a feedback procedure for the feedback reporting. The first UE may receive, from the second UE, a second control signal indicating a type of distance measurement corresponding to the threshold distance for triggering feedback reporting.

27 Claims, 10 Drawing Sheets

(56) References Cited

OTHER PUBLICATIONS

Sequans Communications: "On HARQ Procedure for NR Sidelink", 3GPP Draft, 3GPP TSG RAN WG1 Meeting #99, R1-1913012, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 18, 2019-Nov. 22, 2019, Nov. 8, 2019 (Nov. 8, 2019), XP051820263, 6 Pages, Retrieved from the Internet: URL: https://ftp.3gpp.org/tsg_ran/WG1_RL1/TSGR1_99/Docs/R1-1913012.zip R1-1913012 -Procedures.doc [Retrieved on Nov. 8, 2019] pp. 3,5.

\* cited by examiner

TRAVERSABLE DISTANCE BASED FEEDBACK REPORT TRIGGERING

FIELD OF TECHNOLOGY

The following relates to wireless communications, including traversable distance based feedback report triggering.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

A first UE may fail receive a data signal but fail in successfully decoding the data signal. The first UE may provide feedback information to a second UE based on failing to successfully decode the data signal and a distance between the first UE and the second UE, and the distance may be a two dimensional or three dimensional distance. Current techniques for providing feedback information and calculating a distance between UEs may fail to utilize various information for calculating the distance.

SUMMARY

The described techniques relate to improved methods, systems, devices, and apparatuses that support traversable distance based feedback report triggering. Generally, the described techniques provide for reducing signaling overhead and reducing network congestion by performing feedback procedures based on a traversable distance between a first user equipment (UE) and a second UE. For example, the first UE may calculate a traversable distance and transmit a feedback signal to the second UE based on the traversable distance being less than or equal to a range value, and the first UE may refrain from transmitting a feedback signal to the second UE based on the traversable distance being greater than the range value.

For example, a first UE may receive, from a second UE, a first control signal indicating a range value corresponding to a threshold distance for triggering feedback reporting from the first UE for transmissions from the second UE. The first UE may calculate a traversable distance corresponding to a traversable route between the first UE and the second UE, determine, based on the calculated traversable distance and the range value, whether the first UE is within the threshold distance for triggering feedback reporting, and perform, based on whether the first UE is within the threshold distance, a feedback procedure for the feedback reporting. In some cases, the first UE may receive, from the second UE, a second control signal indicating a type of distance measurement corresponding to the threshold distance for triggering feedback reporting.

A method for wireless communication at a first UE is described. The method may include receiving, from a second UE, a first control signal indicating a range value corresponding to a threshold distance for triggering feedback reporting from the first UE for transmissions from the second UE, calculating a traversable distance corresponding to a traversable route between the first UE and the second UE, determining, based on the calculated traversable distance and the range value, whether the first UE is within the threshold distance for triggering feedback reporting, and performing, based on whether the first UE is within the threshold distance, a feedback procedure for the feedback reporting.

An apparatus for wireless communication at a first UE is described. The apparatus may include a processor, memory in electronic communication with the processor, and instructions stored in the memory. The instructions may be executable by the processor to cause the apparatus to receive, from a second UE, a first control signal indicating a range value corresponding to a threshold distance for triggering feedback reporting from the first UE for transmissions from the second UE, calculate a traversable distance corresponding to a traversable route between the first UE and the second UE, determine, based on the calculated traversable distance and the range value, whether the first UE is within the threshold distance for triggering feedback reporting, and perform, based on whether the first UE is within the threshold distance, a feedback procedure for the feedback reporting.

Another apparatus for wireless communication at a first UE is described. The apparatus may include means for receiving, from a second UE, a first control signal indicating a range value corresponding to a threshold distance for triggering feedback reporting from the first UE for transmissions from the second UE, means for calculating a traversable distance corresponding to a traversable route between the first UE and the second UE, means for determining, based on the calculated traversable distance and the range value, whether the first UE is within the threshold distance for triggering feedback reporting, and means for performing, based on whether the first UE is within the threshold distance, a feedback procedure for the feedback reporting.

A non-transitory computer-readable medium storing code for wireless communication at a first UE is described. The code may include instructions executable by a processor to receive, from a second UE, a first control signal indicating a range value corresponding to a threshold distance for triggering feedback reporting from the first UE for transmissions from the second UE, calculate a traversable distance corresponding to a traversable route between the first UE and the second UE, determine, based on the calculated traversable distance and the range value, whether the first UE is within the threshold distance for triggering feedback reporting, and perform, based on whether the first UE is within the threshold distance, a feedback procedure for the feedback reporting.

Some examples of the method, apparatuses, and non-transitory computer-readable medium described herein may further include operations, features, means, or instructions for receiving, from the second UE, a second control signal indicating a type of distance measurement corresponding to the threshold distance for triggering feedback reporting.

In some examples of the method, apparatuses, and non-transitory computer-readable medium described herein, the type of distance measurement includes the traversable distance, a two dimensional distance, a three dimensional distance, or a combination thereof.

Some examples of the method, apparatuses, and non-transitory computer-readable medium described herein may further include operations, features, means, or instructions for transmitting a signal indicating a capability of the first UE of supporting traversable distance calculation, where the first control signal may be received based on the capability of the first UE.

Some examples of the method, apparatuses, and non-transitory computer-readable medium described herein may further include operations, features, means, or instructions for receiving a capability request for the capability of the first UE of supporting traversable distance calculation, where transmitting the signaling indicating the capability may be based on receiving the capability request.

Some examples of the method, apparatuses, and non-transitory computer-readable medium described herein may further include operations, features, means, or instructions for selecting a type of distance measurement corresponding to the threshold distance for triggering feedback reporting based on one or environmental parameters associated with the first UE.

Some examples of the method, apparatuses, and non-transitory computer-readable medium described herein may further include operations, features, means, or instructions for calculating a two dimensional distance between the first UE and the second UE, a three dimensional distance between the first UE and the second UE, or both and determining, based on the calculated two dimensional distance, the calculated three dimensional distance, or both, whether the first UE may be within the threshold distance for triggering feedback reporting.

In some examples of the method, apparatuses, and non-transitory computer-readable medium described herein, calculating the traversable distance may include operations, features, means, or instructions for determining a geographic location of the first UE and the second UE and determining the traversable route between the first UE and the second UE based on map information at the first UE.

Some examples of the method, apparatuses, and non-transitory computer-readable medium described herein may further include operations, features, means, or instructions for determining a travel time between the first UE and the second UE based on the traversable route between the first UE and the second UE and one or more traffic parameters associated with the traversable route, where performing the feedback procedure may be further based on the travel time.

In some examples of the method, apparatuses, and non-transitory computer-readable medium described herein, the determining may include operations, features, means, or instructions for determining that the first UE may be outside of the threshold distance for triggering feedback reporting, and where performing the feedback procedure includes refraining from transmitting a negative acknowledgement signal to the second UE.

DETAILED DESCRIPTION

Figure 1:
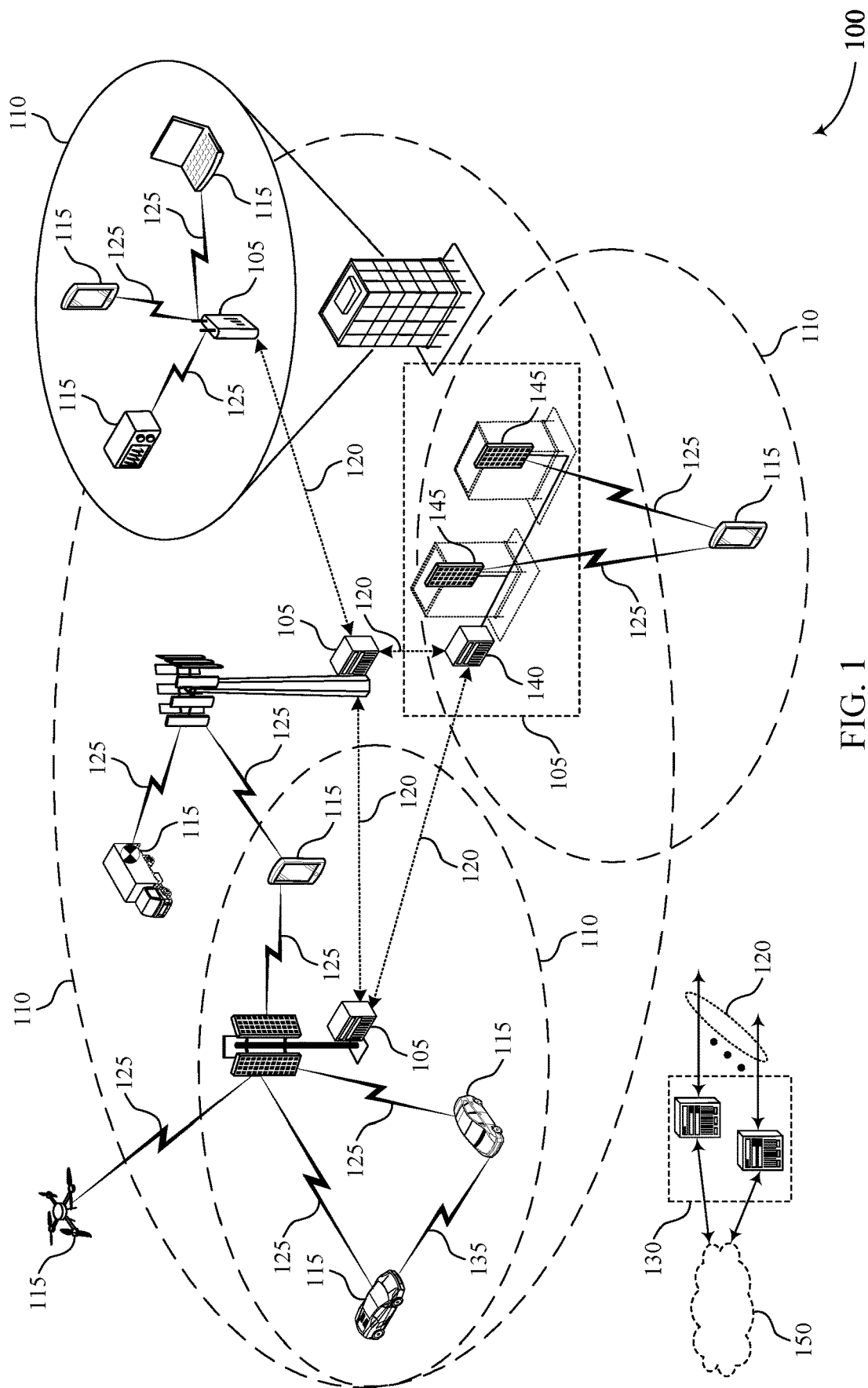
FIG. 1 illustrates an example of a wireless communications system that supports traversable distance based feedback report triggering in accordance with aspects of the present disclosure.

In some wireless communications systems, such as vehicle to vehicle (V2V) or vehicle to everything (V2X) systems, a first user equipment (UE) may perform a feedback procedure based on a distance between the first UE (e.g., a receiving device) and a second UE (e.g., a transmitting device). In some cases, the first UE may calculate a two dimensional distance to the second UE, while in some other cases, the first UE may calculate a three dimensional distance to the second UE. In such systems, the first UE may provide feedback information (e.g., a negative acknowledgement (NACK)) to the second UE based on the calculated distance. In some cases, the first UE may receive a control signal from the second UE, and the control signal may indicate a range value for feedback reporting. For example, the first UE may fail in successfully decoding a data signal, and the first UE may transmit a NACK to the second UE based on failing to successfully decode the signal and determining that the calculated distance is less than or equal to the range value. This may, however, increase signaling overhead, as the calculated two dimensional or three dimensional distance may fail to accurately represent the relevant distance (e.g., the road distance, the traversable distance, etc.) between the first UE and the second UE for purposes of transmitting feedback, which may result in increased signaling (e.g., additional NACKs) and network congestion.

Various aspects of the present disclosure provide techniques for reporting feedback in the context of a multiple UEs. For example, the first UE may calculate a traversable distance (e.g., a road distance) corresponding to a traversable route (e.g., a route that a UE such as a vehicle would take) between the first UE and the second UE, and the first UE may determine whether the first UE is within a distance threshold for triggering feedback reporting based on the calculated traversable distance. The first UE may transmit a NACK to the second UE based on determining that the first UE is within the threshold distance, and the first UE may refrain from transmitting a NACK to the second UE based on determining that the first UE is not within the threshold distance. In some cases, the traversable distance may be calculated based on location information (e.g., longitude and latitude information, elevation information, etc.) and map information (e.g., a road distance between the first UE and the second UE). For example, the first UE may determine location information that includes the location of the first UE and the location of the second UE, as well as map information that includes a road distance between the first UE and the second UE, and the first UE may refrain from transmitting a NACK to the second UE based on the road distance being greater than the range value. Refraining from transmitting NACK signals may reduce control signaling and reduce network congestion.

Such techniques may include receiving, at a first UE (e.g., a receiving device) a first control signal from a second UE (e.g., a transmitting device). The first control signal may indicate a range value corresponding to a threshold distance for triggering feedback reporting from the first UE for transmissions from the second UE. In some cases, the second UE may transmit a group of data signals to the first UE (e.g., via broadcast, groupcast or unicast transmissions), but the first UE may fail to successfully decode one or more data signals of the group of data signals. The first UE may calculate a traversable distance corresponding to a traversable route between the first UE and the second UE, and the first UE may determine, based on the calculated traversable distance and the range value, whether the first UE is within the threshold distance for triggering feedback reporting. For example, the first UE may transmit a feedback signal (e.g., a NACK) based on the traversable distance (e.g., the road distance) being less than the range value.

Aspects of the disclosure are initially described in the context of wireless communications systems. Aspects of the disclosure are then described with reference to a process flow. Aspects of the disclosure are further illustrated by and described with reference to apparatus diagrams, system diagrams, and flowcharts that relate to traversable distance based feedback report triggering.

FIG. 1 illustrates an example of a wireless communications system 100 that supports traversable distance based feedback report triggering in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A first UE 115 (e.g., a vehicle UE) may receive, from a second UE 115 (e.g., a vehicle UE), a first control signal indicating a range value corresponding to a threshold distance for triggering feedback reporting (e.g., HARQ feedback) from the first UE 115 for transmissions from the second UE 115. The first UE 115 may calculate a traversable distance corresponding to a traversable route between the first UE 115 and the second UE 115, determine, based on the calculated traversable distance and the range value, whether the first UE 115 is within the threshold distance for triggering feedback reporting, and perform, based on whether the first UE 115 is within the threshold distance, a feedback procedure for the feedback reporting. In some cases, the first UE 115 may receive, from the second UE 115, a second control signal indicating a type of distance measurement corresponding to the threshold distance for triggering feedback reporting.

In some cases, the first UE 115 may perform the feedback procedure, directly or indirectly, based on one or more environmental factors such as weather conditions, traffic conditions, traffic signals, or the like. For example, in addition to the calculated traversable distance, the first UE 115 may take into account the amount of traffic signals or the amount of existing traffic associated with a given route to determine a duration of time associated with traversing the traversable distance. In another example, the first UE 115 may query a weather application or a traffic application to determine a weather condition or traffic condition, and the first UE 115 may use the determined condition in the feedback procedure. As such, even if the traversable distance is less than the range value indicated for feedback signaling, the first UE 115 may determine that a travel time along the traversable distance exceeds a threshold, and may refrain from transmitting feedback to the second UE 115 based on the travel time.

Figure 2:
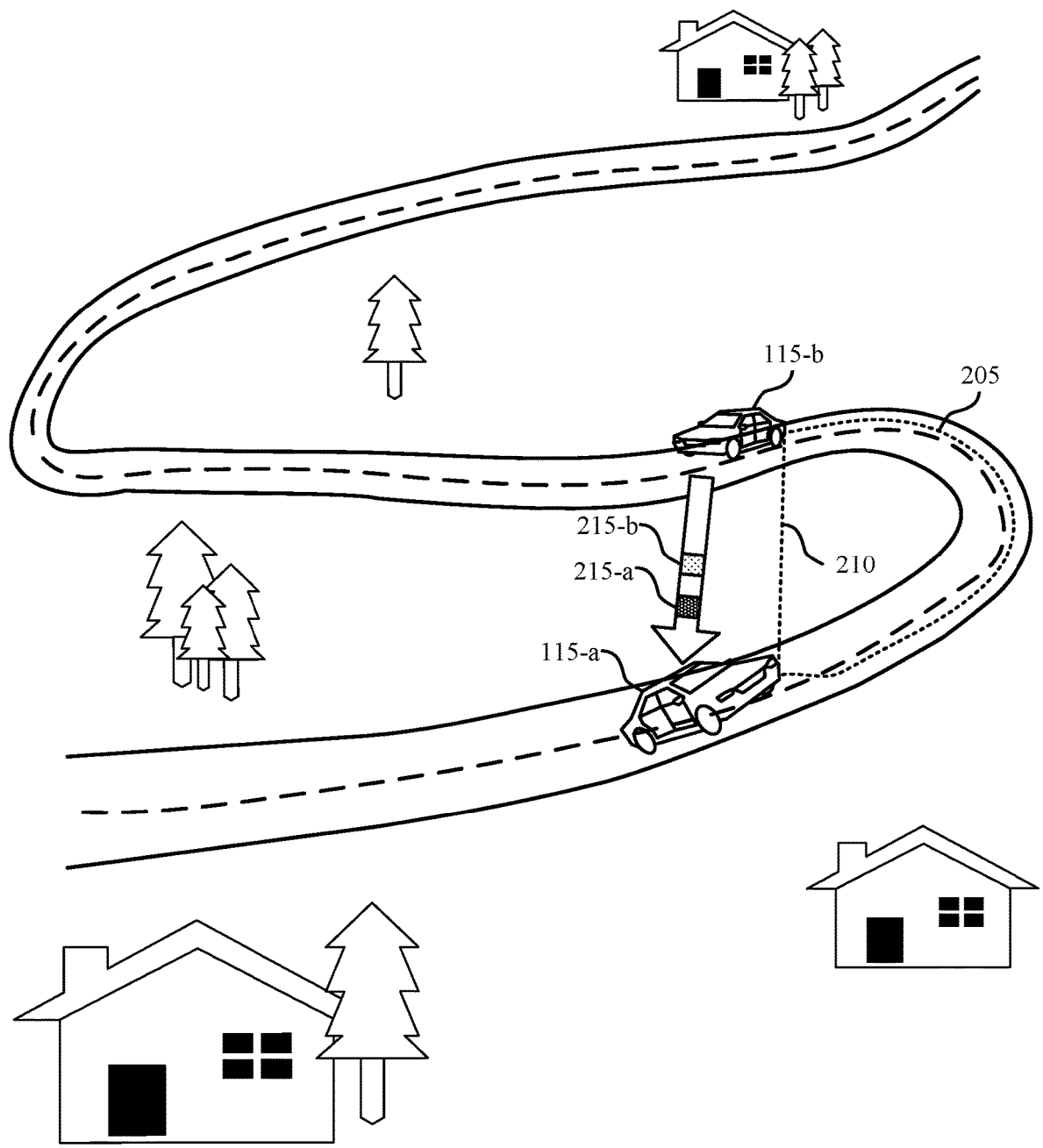
FIG. 2 illustrates an example of a wireless communications system that supports traversable distance based feedback report triggering in accordance with aspects of the present disclosure.

FIG. 2 illustrates an example of a wireless communications system 200 that supports traversable distance based feedback report triggering in accordance with aspects of the present disclosure. In some examples, wireless communications system 200 may implement aspects of wireless communications system 100. Wireless communications system 200 may include UE 115-a and UE 115-b, which may be examples of a UE 115 as described with reference to FIG. 1.

UE 115-a (e.g., a first vehicle UE, a receiving device) may receive control signal 215-a (e.g., a first control signal) from UE 115-b (e.g., a second vehicle UE, a transmitting device). The control signal 215-a may indicate a range value corresponding to a threshold distance for triggering feedback reporting (e.g., HARQ feedback) from UE 115-a. The threshold distance may indicate a distance for which a receiving device (e.g., UE 115-a) should use to determine whether to transmit feedback information to a transmitting device (e.g., UE 115-b). For example, UE 115-a may transmit feedback information to UE 115-b when the distance between the UE 115-a and UE 115-b is less than or equal to the threshold distance, and UE 115-a may refrain from transmitting feedback information (e.g., an acknowledgement (ACK), a negative acknowledgement (NACK), etc.) to UE 115-b when the distance between the UE 115-a and UE 115-b is greater than the threshold distance. Such distance-based feedback reporting may limit the amount of signaling being transmitted between UEs, since a UE (e.g., UE 115-a) may be interested in successfully decoding transmissions from other UEs (e.g., UE 115-b) when the other UE is within a threshold distance. Otherwise, if the two UEs are not within a threshold distance, then a UE may not be interested in the transmissions from the other UE (e.g., because there is low likelihood of collision or interference) and may therefore not transmit a NACK if the original transmission was unsuccessfully decoded. However, some techniques for measuring the distance between two UEs account only for two dimensional or three dimensional distance, rather than an actual distance (e.g., a traversable road distance) that the two UEs would travel to become close to each other.

In accordance with aspects of the present disclosure, UE 115-a may calculate a traversable distance 205, and the traversable distance 205 may correspond to a traversable route between UE 115-a and UE 115-b. For example, the traversable distance 205 may correspond to a route between UE 115-a and UE 115-b along a road or other path that is legally traversable by the UEs. In some cases, the traversable distance 205 may provide UE 115-a with information relevant to how close UE 115-a and UE 115-b are to each other. For example, the direct distance 210 (e.g., a two dimensional distance, a three dimensional distance, etc.) may indicate a distance between 115-a and UE 115-b that does not encompass the legal or traversable route between UE 115-a and UE 115-b. As such, calculating the traversable distance 205 may support UE 115-a in determining a proximity to UE 115-b, where the determined proximity encompasses environment factors such a known or predicted path of travel, traffic congestion, road conditions, traffic signals, traffic laws, or any combination of these factors.

In some cases, UE 115-a may determine the traversable distance 205 (e.g., a road distance) based on location information and map information. The location information may include a geographic longitude, latitude, or elevation, which may be determined based on a global navigation satellite system (GNSS) signal, and the map information may be provided by a V2X application. UE 115-a may use the location information and the map information to determine the traversable distance 205, and UE 115-a may use the traversable distance 205 as part of a feedback procedure (e.g., a HARQ feedback procedure or a HARQ feedback decision, such as whether to transmit a NACK).

In some cases, UE 115-b may indicate a communication range to UE 115-a when UE 115-b transmits a data packet to UE 115-a (e.g., via broadcast, groupcast, or unicast transmissions), and UE 115-a may transmit feedback information to UE 115-b when UE 115-a is within the indicated communication range. In some cases, UE 115-b may indicate a range type (e.g., a two dimensional range, a three dimensional range) and/or a distance configuration. For example, control signal 215-a may indicate a distance configuration that includes a first distance corresponding to a first distance type (e.g., a road distance), a second a distance corresponding to a second distance type (e.g., a two dimensional distance), a third distance corresponding to a third distance type (e.g., three dimensional distance), or a combination of distance parameters. UE 115-b may indicate distance values corresponding to the distance types, or UE 115-a may be configured with a distance value for each distance type. UE 115-b may indicate one or more distance types to UE 115-a, and UE 115-a may perform a feedback procedure based on the one or more distance types.

In some cases, UE 115-a (e.g., a vehicle) may use the traversable distance 215 (e.g., a road distance) as a reference for distance-based HARQ feedback transmission. In some other cases, UE 115-a may adapt (e.g., autonomously) how to interpret the threshold distance. For example, in some scenarios (e.g., rural settings, low traffic environments, etc.), UE 115-a may use a threshold distance corresponding to a two dimensional or three dimensional distance, while in some other scenarios (e.g., urban environments, high traffic environments, poor rainy conditions such as rain or snow, etc.), UE 115-a may use a threshold distance corresponding to a road distance. For example, a UE 115-a may use a threshold distance corresponding to a road distance for V2V, V2I, or I2V operations, and UE 115-a may use a threshold distance corresponding to a two dimensional or three dimensional distance for a V2P or P2V operation.

UE 115-a may use a combination of distance types to perform the feedback procedure. For example, UE 115-a may calculate multiple distances (e.g., a traversable distance, a two dimensional distance, a three dimensional distance) and determine whether to transmit a NACK signal to UE 115-b based on any of the calculated distances satisfying a distance threshold, all of the calculated distances satisfying the distance threshold, or particular calculated distances satisfying the distance threshold. The use of multiple measures of distance may improve vehicle safety, as transmitting a NACK signal to UE 115-b based on satisfying a distance threshold for any of the calculated distances may improve signaling reliability.

Based on the traversable distance 205 and the range value indicated in control signal 215-a, UE 115-a may determine whether UE 115-a is within the threshold distance for triggering feedback reporting. UE 115-b may transmit data signal 215-b to UE 115-a, and UE 115-a may perform a feedback procedure associated with the data signal 215-b based on the traversable distance 205 and the range value. For example, UE 115-a may compare the traversable distance 205 to the range value, and if the traversable distance 205 is less than or equal to the range value, UE 115-a may transmit a feedback report to UE 115-b as part of the feedback procedure. In another example, if the traversable distance 205 is greater than the range value, UE 115-a may refrain from transmitting the feedback report to UE 115-b as part of the feedback procedure.

Performing the feedback procedure based on the traversable distance 205 may reduce signaling overhead and reduce network congestion (e.g., wireless network congestion). For example, a first UE may fail in decoding a data signal and transmit a NACK to a second UE based on a short direct distance (e.g., distance 210), but the first UE may refrain from transmitting the NACK to the second UE based on a traversable distance (e.g., distance 205) that more accurately represents the distance between the first UE and the second UE.

Figure 3:
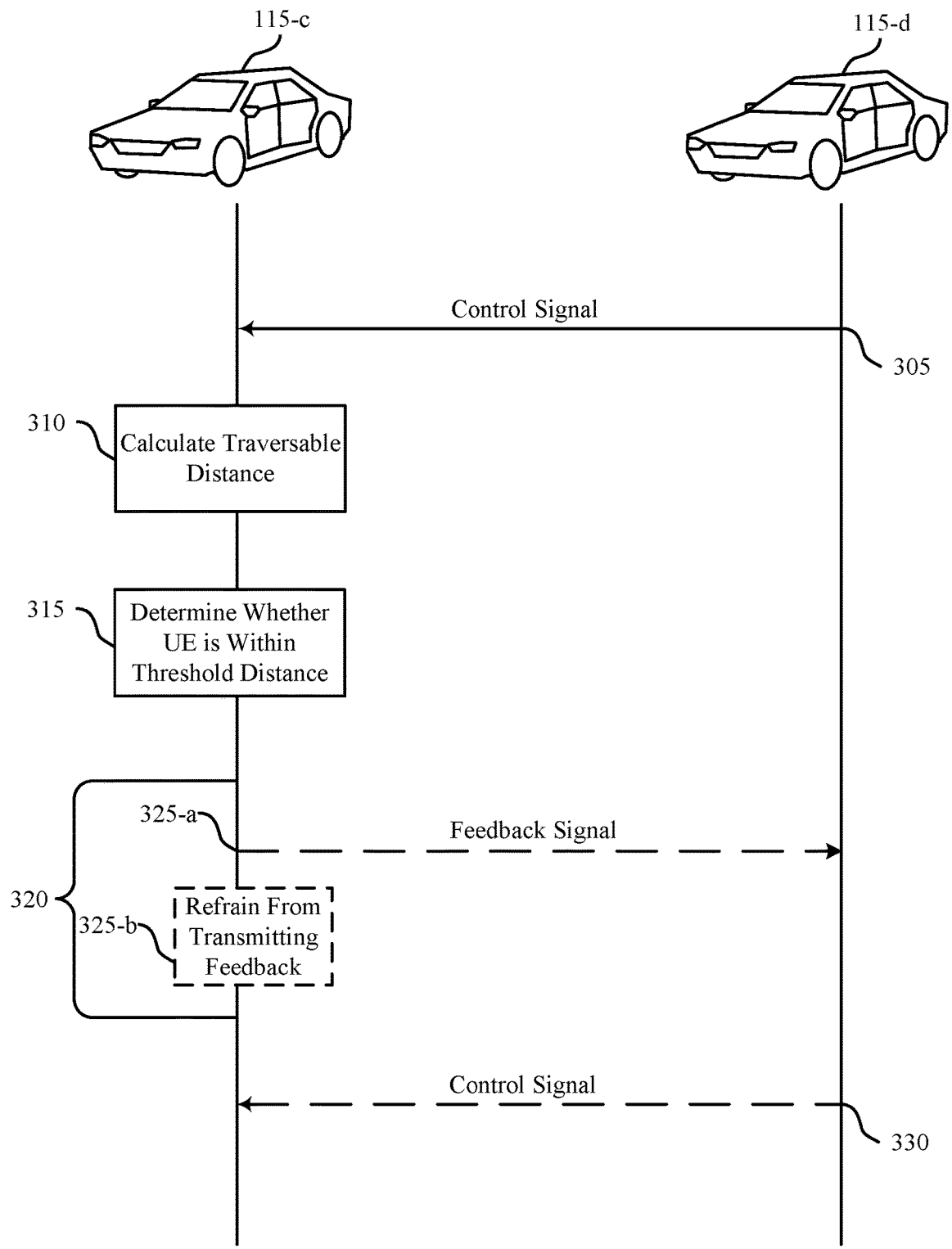
FIG. 3 illustrates an example of a process flow that supports traversable distance based feedback report triggering in accordance with aspects of the present disclosure.

FIG. 3 illustrates an example of a process flow 300 that supports traversable distance based feedback report triggering in accordance with aspects of the present disclosure. In some examples, the process flow 300 may implement aspects of wireless communications systems 100 and 200. The process flow 300 includes UE 115-c (e.g., a first UE, a receiving device) and UE 115-d (e.g., a second UE, a transmitting device), which may be examples of the corresponding devices described with reference to FIGS. 1 and 2. UE 115-c may perform feedback procedures based on a traversable distance to improve network efficiency and reduce signaling overhead. Alternative examples of the following may be implemented, where some steps are performed in a different order than described or are not performed at all. In some cases, steps may include additional features not mentioned below, or further steps may be added.

At 305, UE 115-d may transmit a first control signal to UE 115-c. UE 115-c may receive the first control signal, and the first control signal may indicate a range value corresponding to a threshold distance for triggering feedback reporting from UE 115-c for transmissions from UE 115-d. The range value may correspond to a distance (e.g., a distance in kilometers, miles, meters, feet, centimeters, or inches) and/or a time value (e.g., a time in hours, minutes, seconds, or milliseconds). In some cases, the control signal may indicate a distance type (e.g., a traversable distance, a road distance, a two dimensional distance, or a three dimensional distance) or a combination of distance types.

At 310, UE 115-c may calculate a traversable distance corresponding to a traversable route between UE 115-c and UE 115-d. UE 115-c may additionally calculate a two dimensional route between UE 115-c and UE 115-d and/or a three dimensional route between UE 115-c and UE 115-d. UE 115-c may calculate the traversable distance based on location information, map information, visual/graphic information, weather information, traffic information, or any combination thereof.

UE 115-c may determine, based on the calculated traversable distance and the range value, whether UE 115-c is within the threshold distance for triggering feedback reporting. For example, if the traversable distance is less than or equal to the range value, UE 115-c may determine that UE 115-c is within the threshold distance for triggering feedback, and if the traversable distance is greater than the range value, UE 115-c may determine that UE 115-c is not within the threshold distance for triggering feedback.

At 320, UE 115-c may perform a feedback procedure based on whether the first UE is within the threshold distance. For example, if UE 115-c is within the threshold distance, UE 115-c may transmit feedback signal 325-a (e.g., a NACK signal) to UE 115-d. In another example, if UE 115-c is not within the threshold distance, UE 115-c may refrain from transmitting the feedback signal 325-b.

At 330, UE 115-d may transmit a second control signal to UE 115-c. UE 115-c may receive the second control signal, and the second control signal may indicate a type of distance measurement corresponding to the threshold distance for triggering feedback reporting. For example, the second control signal may indicate a road distance measurement corresponding to the threshold distance for triggering feedback reporting. In another example, the second control signal may indicate multiple distance types such as a road distance and a two dimensional distance or a road type and a three dimensional distance. In some examples, the second control signal may be part of the first control signal transmitted at 205, or may be transmitted before the UE 115-c calculates the traversable distance at 310.

Figure 4:
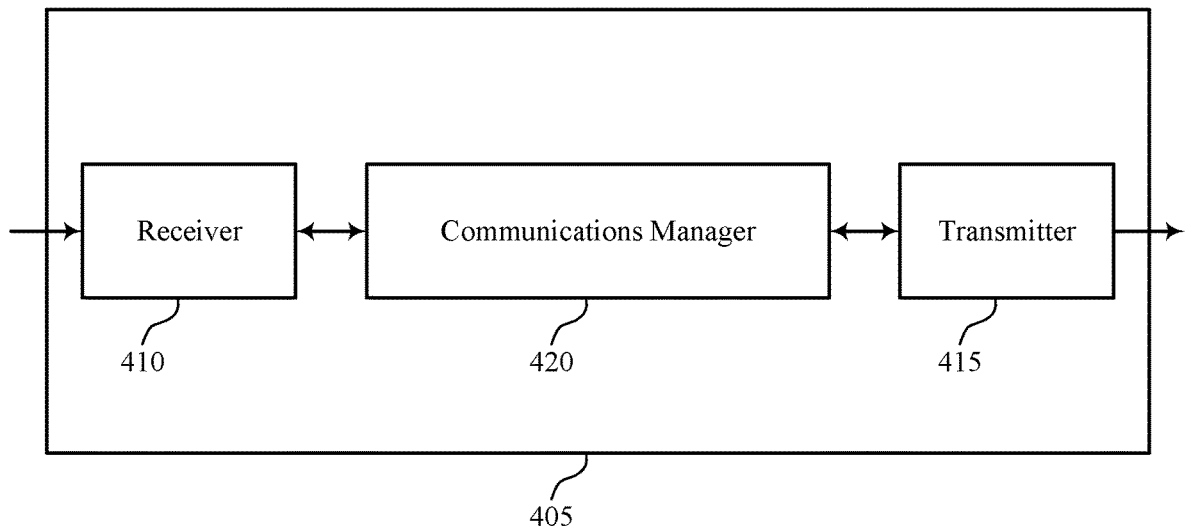
FIGS. 4 and 5 show block diagrams of devices that support traversable distance based feedback report triggering in accordance with aspects of the present disclosure.

FIG. 4 shows a block diagram 400 of a device 405 that supports traversable distance based feedback report triggering in accordance with aspects of the present disclosure. The device 405 may be an example of aspects of a UE 115 as described herein. The device 405 may include a receiver 410, a transmitter 415, and a communications manager 420. The device 405 may also include a processor. Each of these components may be in communication with one another (e.g., via one or more buses).

The receiver 410 may provide a means for receiving information such as packets, user data, control information, or any combination thereof associated with various information channels (e.g., control channels, data channels, information channels related to traversable distance based feedback report triggering). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to traversable distance based feedback report triggering). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of traversable distance based feedback report triggering as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 420 may be configured to perform various operations (e.g., receiving, monitoring, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to receive information, transmit information, or perform various other operations as described herein.

The communications manager 420 may support wireless communication at a first UE in accordance with examples as disclosed herein. For example, the communications manager 420 may be configured as or otherwise support a means for receiving, from a second UE, a first control signal indicating a range value corresponding to a threshold distance for triggering feedback reporting from the first UE for transmissions from the second UE. The communications manager 420 may be configured as or otherwise support a means for calculating a traversable distance corresponding to a traversable route between the first UE and the second UE. The communications manager 420 may be configured as or otherwise support a means for determining, based on the calculated traversable distance and the range value, whether the first UE is within the threshold distance for triggering feedback reporting. The communications manager 420 may be configured as or otherwise support a means for performing, based on whether the first UE is within the threshold distance, a feedback procedure for the feedback reporting.

By including or configuring the communications manager 420 in accordance with examples as described herein, the device 405 (e.g., a processor controlling or otherwise coupled to the receiver 410, the transmitter 415, the communications manager 420, or a combination thereof) may support techniques for reduced processing overhead and reduced power consumption.

Figure 5:
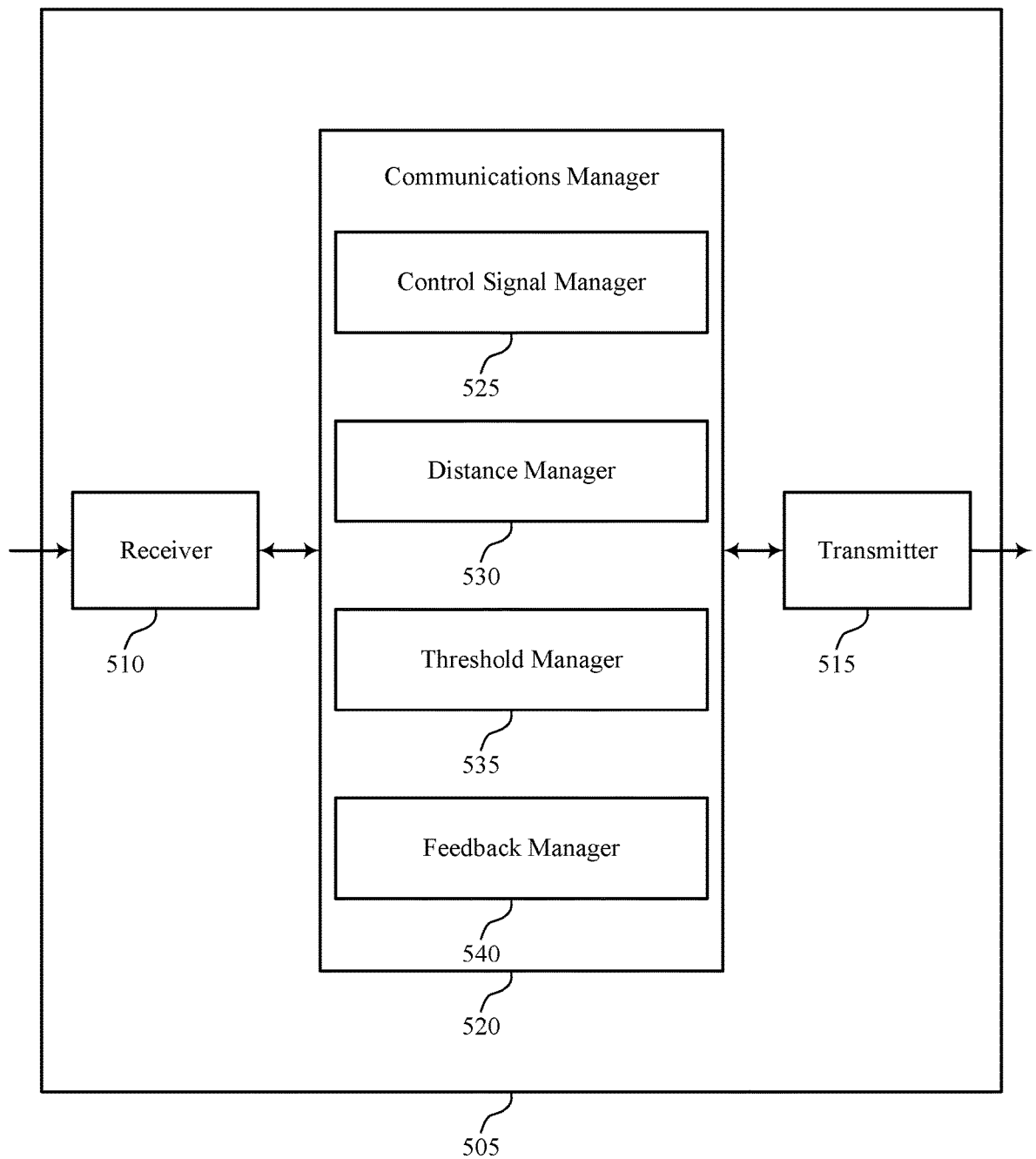

FIG. 5 shows a block diagram 500 of a device 505 that supports traversable distance based feedback report triggering in accordance with aspects of the present disclosure. The device 505 may be an example of aspects of a device 405 or a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to traversable distance based feedback report triggering). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to traversable distance based feedback report triggering). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of traversable distance based feedback report triggering as described herein. For example, the communications manager 520 may include a control signal manager 525, a distance manager 530, a threshold manager 535, a feedback manager 540, or any combination thereof. The communications manager 520 may be an example of aspects of a communications manager 420 as described herein. In some examples, the communications manager 520, or various components thereof, may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a first UE in accordance with examples as disclosed herein. The control signal manager 525 may be configured as or otherwise support a means for receiving, from a second UE, a first control signal indicating a range value corresponding to a threshold distance for triggering feedback reporting from the first UE for transmissions from the second UE. The distance manager 530 may be configured as or otherwise support a means for calculating a traversable distance corresponding to a traversable route between the first UE and the second UE. The threshold manager 535 may be configured as or otherwise support a means for determining, based on the calculated traversable distance and the range value, whether the first UE is within the threshold distance for triggering feedback reporting. The feedback manager 540 may be configured as or otherwise support a means for performing, based on whether the first UE is within the threshold distance, a feedback procedure for the feedback reporting.

Figure 6:
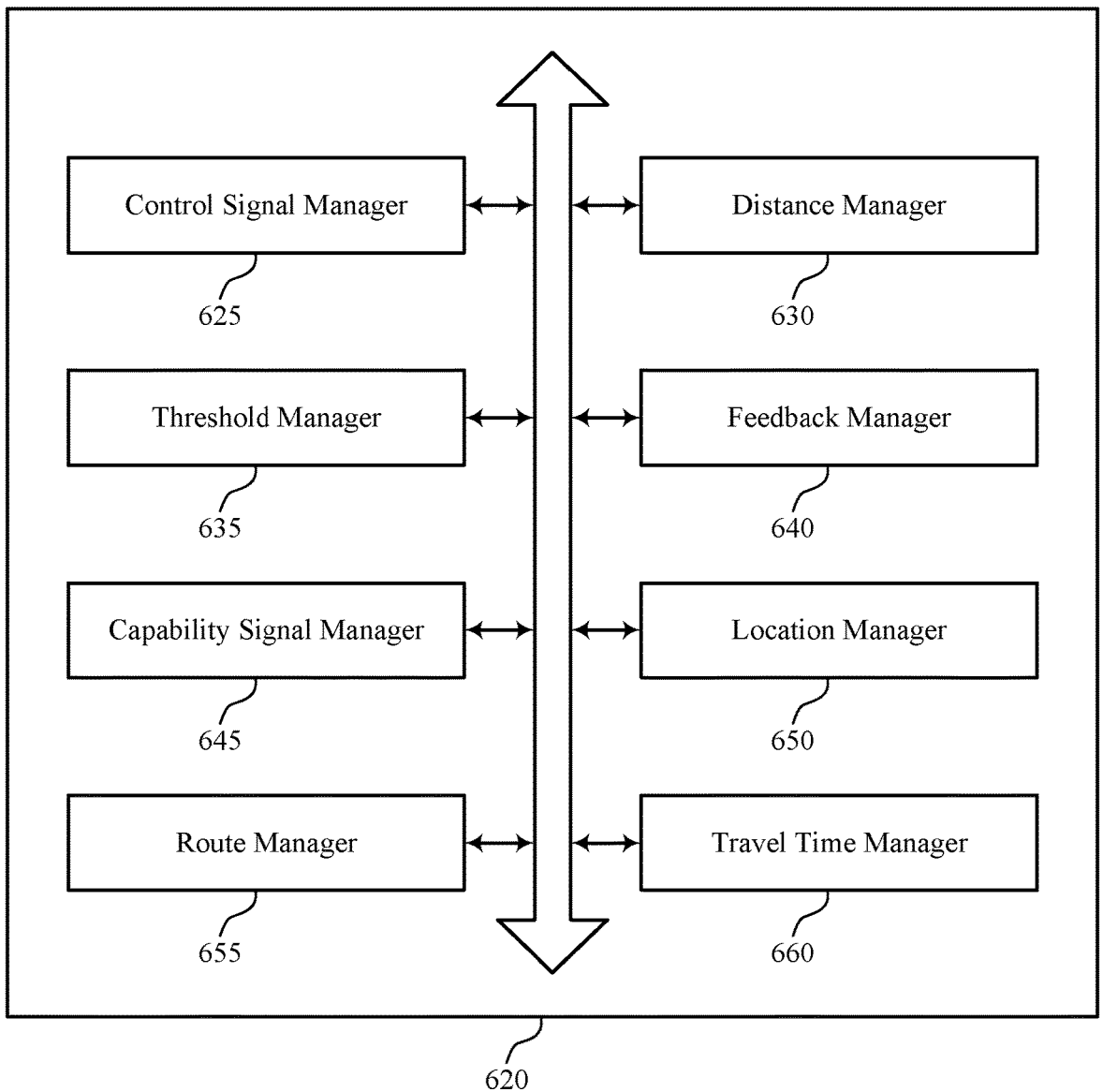
FIG. 6 shows a block diagram of a communications manager that supports traversable distance based feedback report triggering in accordance with aspects of the present disclosure.

FIG. 6 shows a block diagram 600 of a communications manager 620 that supports traversable distance based feedback report triggering in accordance with aspects of the present disclosure. The communications manager 620 may be an example of aspects of a communications manager 420, a communications manager 520, or both, as described herein. The communications manager 620, or various components thereof, may be an example of means for performing various aspects of traversable distance based feedback report triggering as described herein. For example, the communications manager 620 may include a control signal manager 625, a distance manager 630, a threshold manager 635, a feedback manager 640, a capability signal manager 645, a location manager 650, a route manager 655, a travel time manager 660, or any combination thereof. Each of these components may communicate, directly or indirectly, with one another (e.g., via one or more buses).

The communications manager 620 may support wireless communication at a first UE in accordance with examples as disclosed herein. The control signal manager 625 may be configured as or otherwise support a means for receiving, from a second UE, a first control signal indicating a range value corresponding to a threshold distance for triggering feedback reporting from the first UE for transmissions from the second UE. The distance manager 630 may be configured as or otherwise support a means for calculating a traversable distance corresponding to a traversable route between the first UE and the second UE. The threshold manager 635 may be configured as or otherwise support a means for determining, based on the calculated traversable distance and the range value, whether the first UE is within the threshold distance for triggering feedback reporting. The feedback manager 640 may be configured as or otherwise support a means for performing, based on whether the first UE is within the threshold distance, a feedback procedure for the feedback reporting.

In some examples, the control signal manager 625 may be configured as or otherwise support a means for receiving, from the second UE, a second control signal indicating a type of distance measurement corresponding to the threshold distance for triggering feedback reporting.

In some examples, the type of distance measurement includes the traversable distance, a two dimensional distance, a three dimensional distance, or a combination thereof.

In some examples, the capability signal manager 645 may be configured as or otherwise support a means for transmitting a signal indicating a capability of the first UE of supporting traversable distance calculation, where the first control signal is received based on the capability of the first UE.

In some examples, the capability signal manager 645 may be configured as or otherwise support a means for receiving a capability request for the capability of the first UE of supporting traversable distance calculation, where transmitting the signaling indicating the capability is based on receiving the capability request.

In some examples, the distance manager 630 may be configured as or otherwise support a means for selecting a type of distance measurement corresponding to the threshold distance for triggering feedback reporting based on one or environmental parameters associated with the first UE.

In some examples, the distance manager 630 may be configured as or otherwise support a means for calculating a two dimensional distance between the first UE and the second UE, a three dimensional distance between the first UE and the second UE, or both. In some examples, the threshold manager 635 may be configured as or otherwise support a means for determining, based on the calculated two dimensional distance, the calculated three dimensional distance, or both, whether the first UE is within the threshold distance for triggering feedback reporting.

In some examples, to support calculating the traversable distance, the location manager 650 may be configured as or otherwise support a means for determining a geographic location of the first UE and the second UE. In some examples, to support calculating the traversable distance, the route manager 655 may be configured as or otherwise support a means for determining the traversable route between the first UE and the second UE based on map information at the first UE.

In some examples, the travel time manager 660 may be configured as or otherwise support a means for determining a travel time between the first UE and the second UE based on the traversable route between the first UE and the second UE and one or more traffic parameters associated with the traversable route, where performing the feedback procedure is further based on the travel time.

In some examples, to support determining, the threshold manager 635 may be configured as or otherwise support a means for determining that the first UE is outside of the threshold distance for triggering feedback reporting, and where performing the feedback procedure includes refraining from transmitting a negative acknowledgement signal to the second UE.

Figure 7:
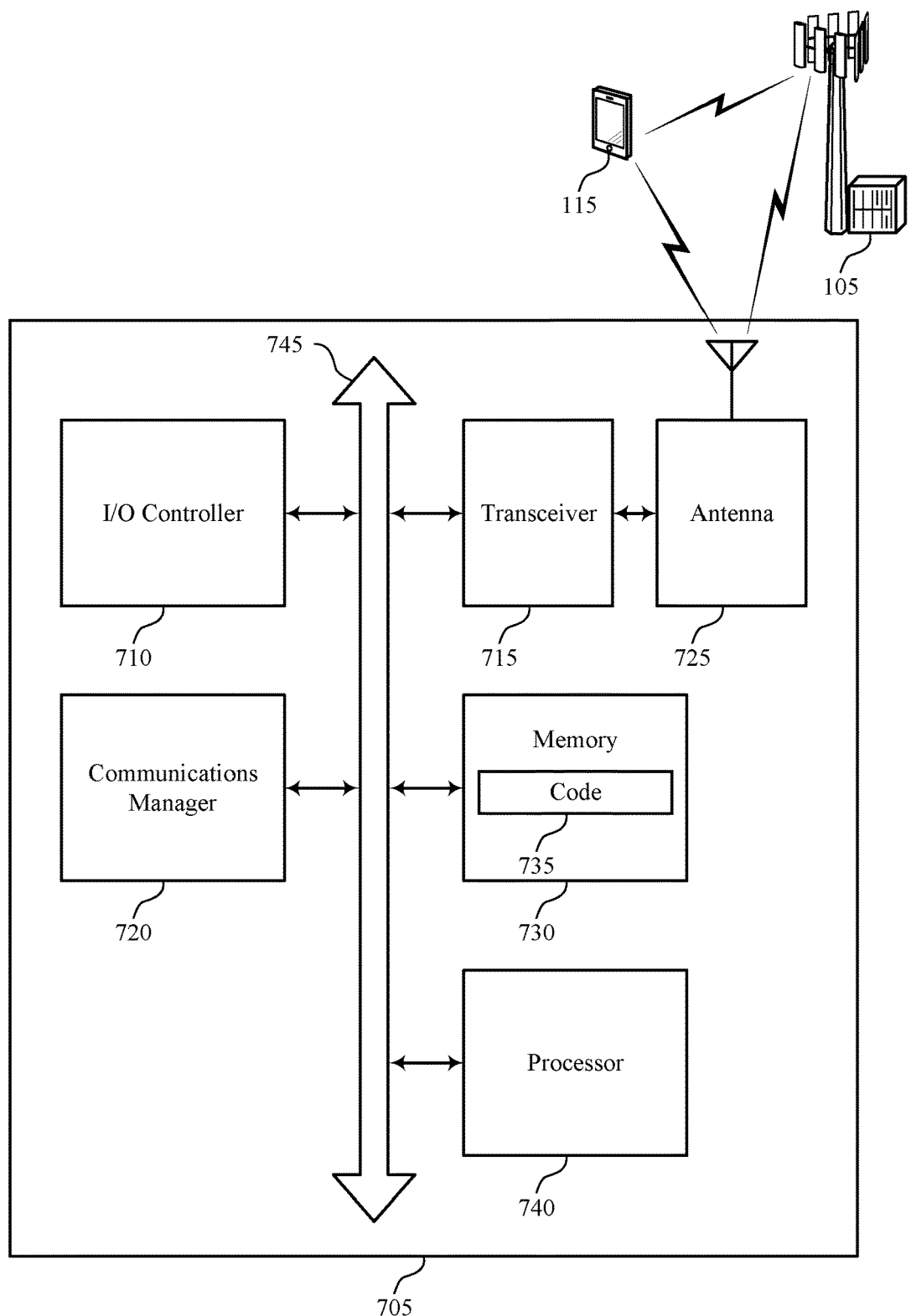
FIG. 7 shows a diagram of a system including a device that supports traversable distance based feedback report triggering in accordance with aspects of the present disclosure.

FIG. 7 shows a diagram of a system 700 including a device 705 that supports traversable distance based feedback report triggering in accordance with aspects of the present disclosure. The device 705 may be an example of or include the components of a device 405, a device 505, or a UE 115 as described herein. The device 705 may communicate wirelessly with one or more base stations 105, UEs 115, or any combination thereof. The device 705 may include components for bi-directional voice and data communications including components for transmitting and receiving communications, such as a communications manager 720, an input/output (I/O) controller 710, a transceiver 715, an antenna 725, a memory 730, code 735, and a processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally or alternatively, the I/O controller 710 may represent or interact with a modem, a keyboard, a mouse, a touchscreen, or a similar device. In some cases, the I/O controller 710 may be implemented as part of a processor, such as the processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include random access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (e.g., when compiled and executed) to perform functions described herein. In some cases, the memory 730 may contain, among other things, a basic I/O system (BIOS) which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting traversable distance based feedback report triggering). For example, the device 705 or a component of the device 705 may include a processor 740 and memory 730 coupled to the processor 740, the processor 740 and memory 730 configured to perform various functions described herein.

The communications manager 720 may support wireless communication at a first UE in accordance with examples as disclosed herein. For example, the communications manager 720 may be configured as or otherwise support a means for receiving, from a second UE, a first control signal indicating a range value corresponding to a threshold distance for triggering feedback reporting from the first UE for transmissions from the second UE. The communications manager 720 may be configured as or otherwise support a means for calculating a traversable distance corresponding to a traversable route between the first UE and the second UE. The communications manager 720 may be configured as or otherwise support a means for determining, based on the calculated traversable distance and the range value, whether the first UE is within the threshold distance for triggering feedback reporting. The communications manager 720 may be configured as or otherwise support a means for performing, based on whether the first UE is within the threshold distance, a feedback procedure for the feedback reporting.

By including or configuring the communications manager 720 in accordance with examples as described herein, the device 705 may support techniques that reduce signaling overhead and prevent network congestion. The techniques may additionally reduce power consumption, thereby improving battery life.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of traversable distance based feedback report triggering as described herein, or the processor 740 and the memory 730 may be otherwise configured to perform or support such operations.

Figure 8:
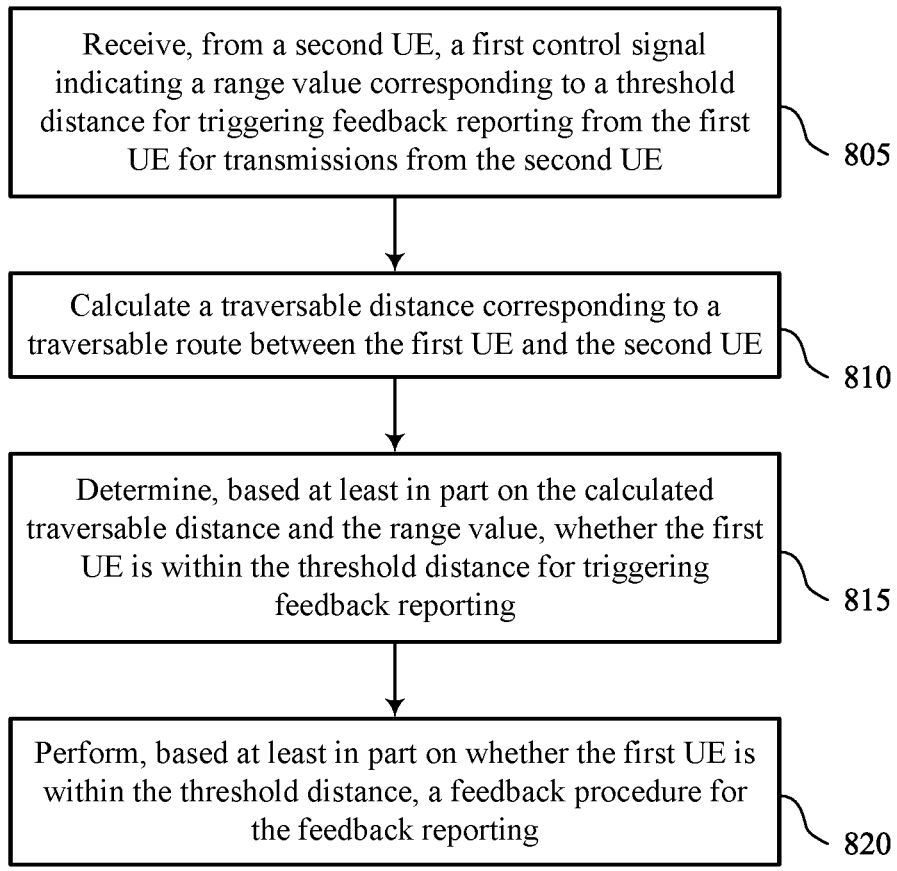
FIGS. 8 through 10 show flowcharts illustrating methods that support traversable distance based feedback report triggering in accordance with aspects of the present disclosure.

FIG. 8 shows a flowchart illustrating a method 800 that supports traversable distance based feedback report triggering in accordance with aspects of the present disclosure. The operations of the method 800 may be implemented by a UE or its components as described herein. For example, the operations of the method 800 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 805, the method may include receiving, from a second UE, a first control signal indicating a range value corresponding to a threshold distance for triggering feedback reporting from the first UE for transmissions from the second UE. The operations of 805 may be performed in accordance with examples as disclosed herein. In some examples, aspects of the operations of 805 may be performed by a control signal manager 625 as described with reference to FIG. 6.

At 810, the method may include calculating a traversable distance corresponding to a traversable route between the first UE and the second UE. The operations of 810 may be performed in accordance with examples as disclosed herein. In some examples, aspects of the operations of 810 may be performed by a distance manager 630 as described with reference to FIG. 6.

At 815, the method may include determining, based on the calculated traversable distance and the range value, whether the first UE is within the threshold distance for triggering feedback reporting. The operations of 815 may be performed in accordance with examples as disclosed herein. In some examples, aspects of the operations of 815 may be performed by a threshold manager 635 as described with reference to FIG. 6.

At 820, the method may include performing, based on whether the first UE is within the threshold distance, a feedback procedure for the feedback reporting. The operations of 820 may be performed in accordance with examples as disclosed herein. In some examples, aspects of the operations of 820 may be performed by a feedback manager 640 as described with reference to FIG. 6.

Figure 9:
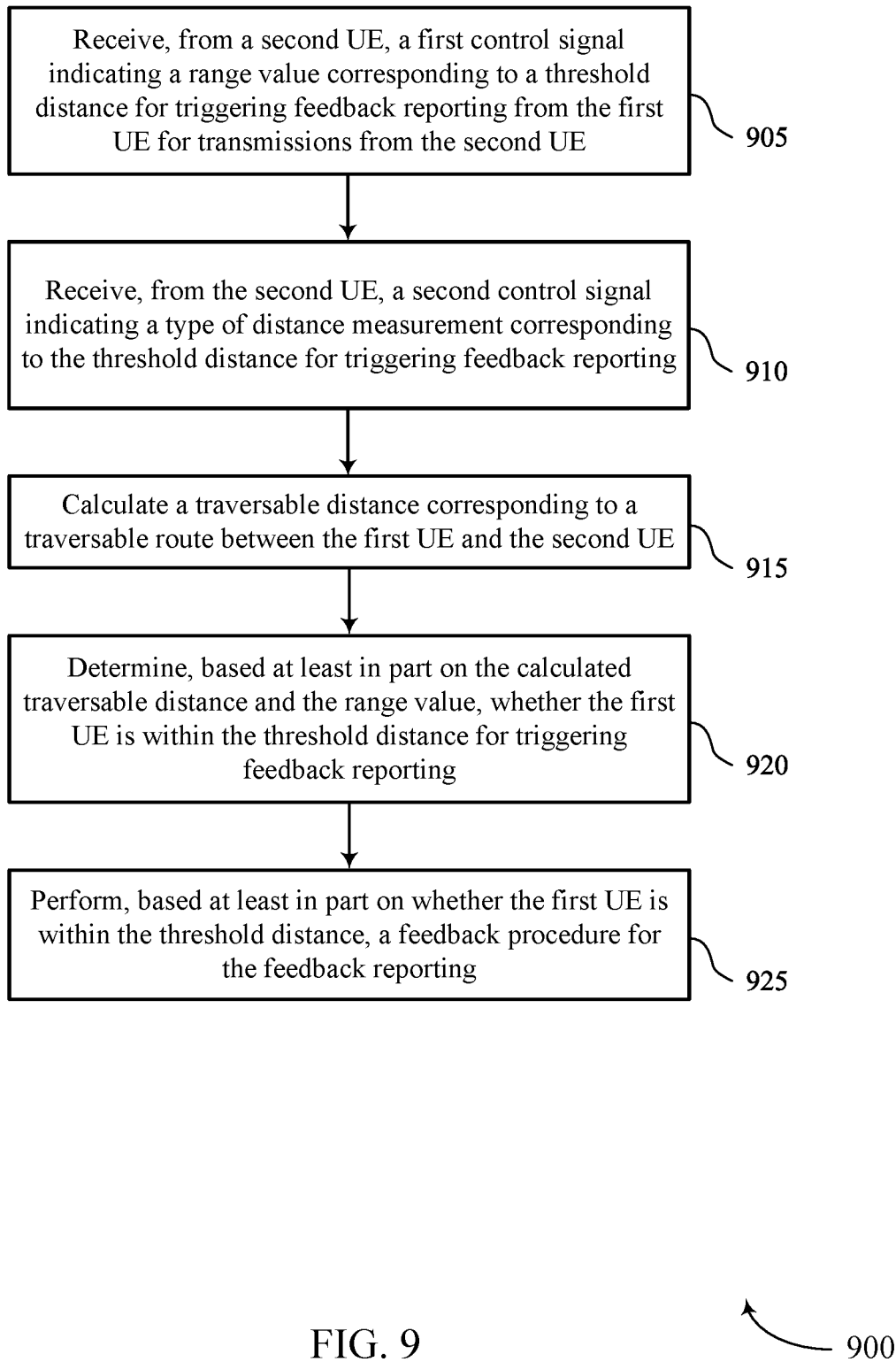

FIG. 9 shows a flowchart illustrating a method 900 that supports traversable distance based feedback report triggering in accordance with aspects of the present disclosure. The operations of the method 900 may be implemented by a UE or its components as described herein. For example, the operations of the method 900 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 905, the method may include receiving, from a second UE, a first control signal indicating a range value corresponding to a threshold distance for triggering feedback reporting from the first UE for transmissions from the second UE. The operations of 905 may be performed in accordance with examples as disclosed herein. In some examples, aspects of the operations of 905 may be performed by a control signal manager 625 as described with reference to FIG. 6.

At 910, the method may include receiving, from the second UE, a second control signal indicating a type of distance measurement corresponding to the threshold distance for triggering feedback reporting. The operations of 910 may be performed in accordance with examples as disclosed herein. In some examples, aspects of the operations of 910 may be performed by a control signal manager 625 as described with reference to FIG. 6.

At 915, the method may include calculating a traversable distance corresponding to a traversable route between the first UE and the second UE. The operations of 915 may be performed in accordance with examples as disclosed herein. In some examples, aspects of the operations of 915 may be performed by a distance manager 630 as described with reference to FIG. 6.

At 920, the method may include determining, based on the calculated traversable distance and the range value, whether the first UE is within the threshold distance for triggering feedback reporting. The operations of 920 may be performed in accordance with examples as disclosed herein. In some examples, aspects of the operations of 920 may be performed by a threshold manager 635 as described with reference to FIG. 6.

At 925, the method may include performing, based on whether the first UE is within the threshold distance, a feedback procedure for the feedback reporting. The operations of 925 may be performed in accordance with examples as disclosed herein. In some examples, aspects of the operations of 925 may be performed by a feedback manager 640 as described with reference to FIG. 6.

Figure 10:
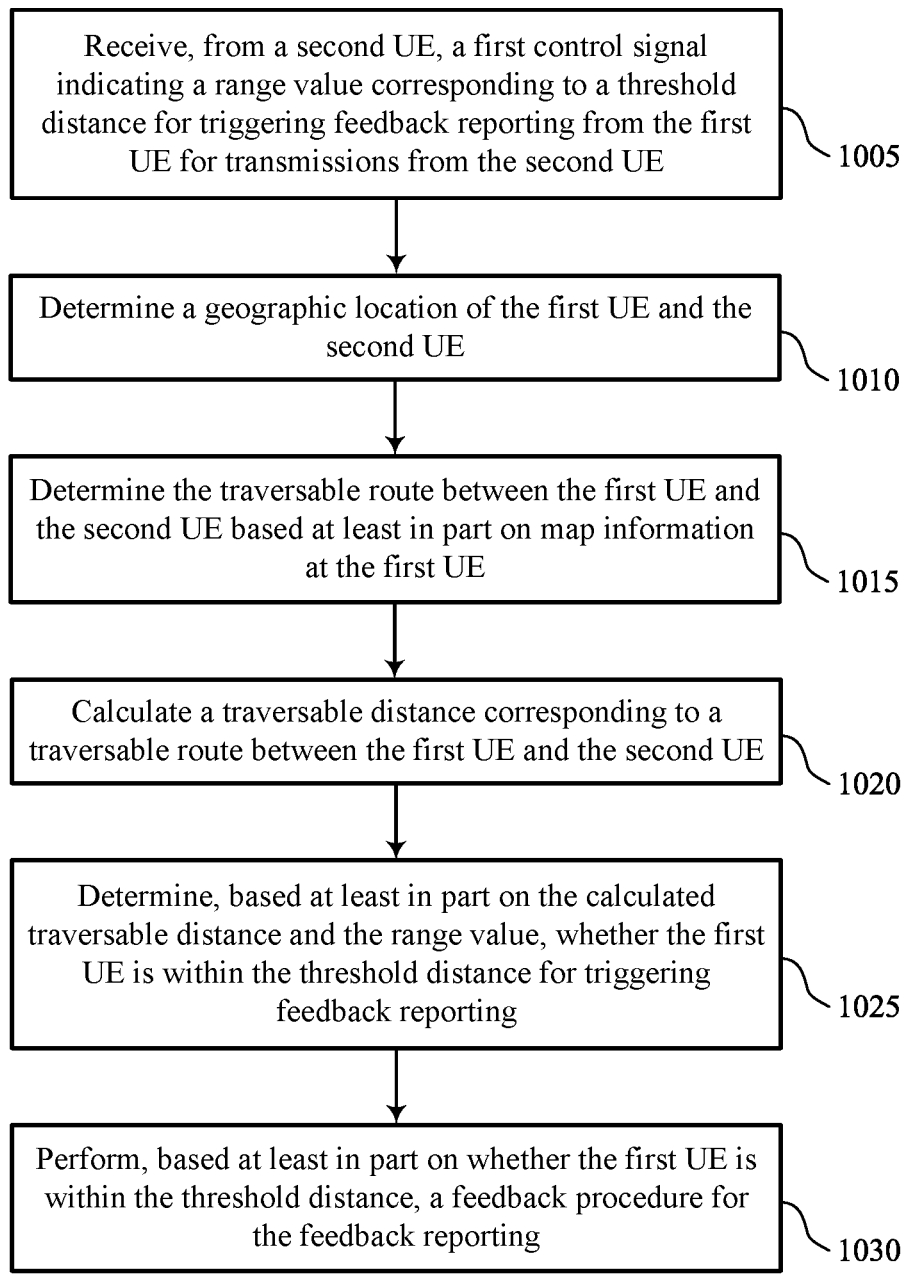

FIG. 10 shows a flowchart illustrating a method 1000 that supports traversable distance based feedback report triggering in accordance with aspects of the present disclosure. The operations of the method 1000 may be implemented by a UE or its components as described herein. For example, the operations of the method 1000 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1005, the method may include receiving, from a second UE, a first control signal indicating a range value corresponding to a threshold distance for triggering feedback reporting from the first UE for transmissions from the second UE. The operations of 1005 may be performed in accordance with examples as disclosed herein. In some examples, aspects of the operations of 1005 may be performed by a control signal manager 625 as described with reference to FIG. 6.

At 1010, the method may include determining a geographic location of the first UE and the second UE. The operations of 1010 may be performed in accordance with examples as disclosed herein. In some examples, aspects of the operations of 1010 may be performed by a location manager 650 as described with reference to FIG. 6.

At 1015, the method may include determining the traversable route between the first UE and the second UE based on map information at the first UE. The operations of 1015 may be performed in accordance with examples as disclosed herein. In some examples, aspects of the operations of 1015 may be performed by a route manager 655 as described with reference to FIG. 6.

At 1020, the method may include calculating a traversable distance corresponding to a traversable route between the first UE and the second UE. The operations of 1020 may be performed in accordance with examples as disclosed herein. In some examples, aspects of the operations of 1020 may be performed by a distance manager 630 as described with reference to FIG. 6.

At 1025, the method may include determining, based on the calculated traversable distance and the range value, whether the first UE is within the threshold distance for triggering feedback reporting. The operations of 1025 may be performed in accordance with examples as disclosed herein. In some examples, aspects of the operations of 1025 may be performed by a threshold manager 635 as described with reference to FIG. 6.

At 1030, the method may include performing, based on whether the first UE is within the threshold distance, a feedback procedure for the feedback reporting. The operations of 1030 may be performed in accordance with examples as disclosed herein. In some examples, aspects of the operations of 1030 may be performed by a feedback manager 640 as described with reference to FIG. 6.

The following provides an overview of aspects of the present disclosure:

Aspect 1: A method for wireless communication at a first UE, comprising: receiving, from a second UE, a first control signal indicating a range value corresponding to a threshold distance for triggering feedback reporting from the first UE for transmissions from the second UE; calculating a traversable distance corresponding to a traversable route between the first UE and the second UE; determining, based at least in part on the calculated traversable distance and the range value, whether the first UE is within the threshold distance for triggering feedback reporting; and performing, based at least in part on whether the first UE is within the threshold distance, a feedback procedure for the feedback reporting.

Aspect 2: The method of aspect 1, further comprising: receiving, from the second UE, a second control signal indicating a type of distance measurement corresponding to the threshold distance for triggering feedback reporting.

Aspect 3: The method of aspect 2, wherein the type of distance measurement comprises the traversable distance, a two dimensional distance, a three dimensional distance, or a combination thereof.

Aspect 4: The method of any of aspects 1 through 3, further comprising: transmitting a signal indicating a capability of the first UE of supporting traversable distance calculation, wherein the first control signal is received based at least in part on the capability of the first UE.

Aspect 5: The method of aspect 4, further comprising: receiving a capability request for the capability of the first UE of supporting traversable distance calculation, wherein transmitting the signaling indicating the capability is based at least in part on receiving the capability request.

Aspect 6: The method of any of aspects 1 through 5, further comprising: selecting a type of distance measurement corresponding to the threshold distance for triggering feedback reporting based at least in part on one or environmental parameters associated with the first UE.

Aspect 7: The method of any of aspects 1 through 6, further comprising: calculating a two dimensional distance between the first UE and the second UE, a three dimensional distance between the first UE and the second UE, or both; and determining, based at least in part on the calculated two dimensional distance, the calculated three dimensional distance, or both, whether the first UE is within the threshold distance for triggering feedback reporting.

Aspect 8: The method of any of aspects 1 through 7, wherein calculating the traversable distance comprises: determining a geographic location of the first UE and the second UE; and determining the traversable route between the first UE and the second UE based at least in part on map information at the first UE.

Aspect 9: The method of any of aspects 1 through 8, further comprising: determining a travel time between the first UE and the second UE based at least in part on the traversable route between the first UE and the second UE and one or more traffic parameters associated with the traversable route, wherein performing the feedback procedure is further based at least in part on the travel time.

Aspect 10: The method of any of aspects 1 through 9, wherein the determining comprises: determining that the first UE is outside of the threshold distance for triggering feedback reporting, and wherein performing the feedback procedure comprises refraining from transmitting a negative acknowledgement signal to the second UE.

Aspect 11: An apparatus for wireless communication at a first UE, comprising a processor; memory coupled with the processor; and instructions stored in the memory and executable by the processor to cause the apparatus to perform a method of any of aspects 1 through 10.

Aspect 12: An apparatus for wireless communication at a first UE, comprising at least one means for performing a method of any of aspects 1 through 10.

Aspect 13: A non-transitory computer-readable medium storing code for wireless communication at a first UE, the code comprising instructions executable by a processor to perform a method of any of aspects 1 through 10.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a first user equipment (UE), comprising:
   transmitting a signal indicating a capability of the first UE of supporting traversable distance calculation;
   receiving, from a second UE subsequent to the signal indicating the capability of the first UE, a first control signal indicating a range value corresponding to a threshold distance for triggering feedback reporting from the first UE for transmissions from the second UE;
   calculating a traversable distance corresponding to a traversable route between the first UE and the second UE;
   determining, based at least in part on the calculated traversable distance and the range value, whether the first UE is within the threshold distance for triggering feedback reporting; and
   performing, based at least in part on whether the first UE is within the threshold distance, a feedback procedure for the feedback reporting.

2. The method of claim 1, further comprising:
   receiving, from the second UE, a second control signal indicating a type of distance measurement corresponding to the threshold distance for triggering feedback reporting.

3. The method of claim 2, wherein the type of distance measurement comprises the traversable distance, a two dimensional distance, a three dimensional distance, or a combination thereof.

4. The method of claim 1, further comprising:
   receiving a capability request for the capability of the first UE of supporting traversable distance calculation, wherein transmitting the signal indicating the capability is based at least in part on receiving the capability request.

5. The method of claim 1, further comprising:
   selecting a type of distance measurement corresponding to the threshold distance for triggering feedback reporting based at least in part on one or more environmental parameters associated with the first UE.

6. The method of claim 1, further comprising:
   calculating a two dimensional distance between the first UE and the second UE, a three dimensional distance between the first UE and the second UE, or both; and
   determining, based at least in part on the calculated two dimensional distance, the calculated three dimensional distance, or both, whether the first UE is within the threshold distance for triggering feedback reporting.

7. The method of claim 1, wherein calculating the traversable distance comprises:
   determining a geographic location of the first UE and the second UE; and
   determining the traversable route between the first UE and the second UE based at least in part on map information at the first UE.

8. The method of claim 1, further comprising:
   determining a travel time between the first UE and the second UE based at least in part on the traversable route between the first UE and the second UE and one or more traffic parameters associated with the traversable route, wherein performing the feedback procedure is further based at least in part on the travel time.

9. The method of claim 1, wherein the determining comprises:
   determining that the first UE is outside of the threshold distance for triggering feedback reporting, and wherein performing the feedback procedure comprises refraining from transmitting a negative acknowledgement signal to the second UE.

10. An apparatus for wireless communication at a first user equipment (UE), comprising:
    a processor;
    memory coupled with the processor; and
    instructions stored in the memory and executable by the processor to cause the apparatus to:
        transmit a signal indicating a capability of the first UE of supporting traversable distance calculation;
        receive, from a second UE subsequent to the signal indicative of the capability of the first UE, a first control signal indicating a range value corresponding to a threshold distance for triggering feedback reporting from the first UE for transmissions from the second UE;
calculate a traversable distance corresponding to a traversable route between the first UE and the second UE;
determine, based at least in part on the calculated traversable distance and the range value, whether the first UE is within the threshold distance for triggering feedback reporting; and
perform, based at least in part on whether the first UE is within the threshold distance, a feedback procedure for the feedback reporting.

11. The apparatus of claim 10, wherein the instructions are further executable by the processor to cause the apparatus to:
receive, from the second UE, a second control signal indicating a type of distance measurement corresponding to the threshold distance for triggering feedback reporting.

12. The apparatus of claim 11, wherein the type of distance measurement comprises the traversable distance, a two dimensional distance, a three dimensional distance, or a combination thereof.

13. The apparatus of claim 10, wherein the instructions are further executable by the processor to cause the apparatus to:
receive a capability request for the capability of the first UE of supporting traversable distance calculation, wherein transmitting the signal indicating the capability is based at least in part on receiving the capability request.

14. The apparatus of claim 10, wherein the instructions are further executable by the processor to cause the apparatus to:
select a type of distance measurement corresponding to the threshold distance for triggering feedback reporting based at least in part on one or more environmental parameters associated with the first UE.

15. The apparatus of claim 10, wherein the instructions are further executable by the processor to cause the apparatus to:
calculate a two dimensional distance between the first UE and the second UE, a three dimensional distance between the first UE and the second UE, or both; and
determine, based at least in part on the calculated two dimensional distance, the calculated three dimensional distance, or both, whether the first UE is within the threshold distance for triggering feedback reporting.

16. The apparatus of claim 10, wherein the instructions to calculate the traversable distance are executable by the processor to cause the apparatus to:
determine a geographic location of the first UE and the second UE; and
determine the traversable route between the first UE and the second UE based at least in part on map information at the first UE.

17. The apparatus of claim 10, wherein the instructions are further executable by the processor to cause the apparatus to:
determine a travel time between the first UE and the second UE based at least in part on the traversable route between the first UE and the second UE and one or more traffic parameters associated with the traversable route, wherein performing the feedback procedure is further based at least in part on the travel time.

18. The apparatus of claim 10, wherein the instructions to determine are executable by the processor to cause the apparatus to:
determine that the first UE is outside of the threshold distance for triggering feedback reporting, and wherein performing the feedback procedure comprises refraining from transmitting a negative acknowledgement signal to the second UE.

19. An apparatus for wireless communication at a first user equipment (UE), comprising:
means for transmitting a signal indicating a capability of the first UE of supporting traversable distance calculation;
means for receiving, from a second UE subsequent to the signal indicating the capability of the first UE, a first control signal indicating a range value corresponding to a threshold distance for triggering feedback reporting from the first UE for transmissions from the second UE;
means for calculating a traversable distance corresponding to a traversable route between the first UE and the second UE;
means for determining, based at least in part on the calculated traversable distance and the range value, whether the first UE is within the threshold distance for triggering feedback reporting; and
means for performing, based at least in part on whether the first UE is within the threshold distance, a feedback procedure for the feedback reporting.

20. The apparatus of claim 19, further comprising:
means for receiving, from the second UE, a second control signal indicating a type of distance measurement corresponding to the threshold distance for triggering feedback reporting.

21. The apparatus of claim 20, wherein the type of distance measurement comprises the traversable distance, a two dimensional distance, a three dimensional distance, or a combination thereof.

22. The apparatus of claim 19, further comprising:
means for receiving a capability request for the capability of the first UE of supporting traversable distance calculation, wherein transmitting the signal indicating the capability is based at least in part on receiving the capability request.

23. The apparatus of claim 21, further comprising:
means for selecting a type of distance measurement corresponding to the threshold distance for triggering feedback reporting based at least in part on one or more environmental parameters associated with the first UE.

24. The apparatus of claim 19, further comprising:
means for calculating a two dimensional distance between the first UE and the second UE, a three dimensional distance between the first UE and the second UE, or both; and
means for determining, based at least in part on the calculated two dimensional distance, the calculated three dimensional distance, or both, whether the first UE is within the threshold distance for triggering feedback reporting.

25. The apparatus of claim 19, wherein the means for calculating the traversable distance comprise:
means for determining a geographic location of the first UE and the second UE; and
means for determining the traversable route between the first UE and the second UE based at least in part on map information at the first UE.

26. The apparatus of claim 19, further comprising:
means for determining a travel time between the first UE and the second UE based at least in part on the traversable route between the first UE and the second UE and one or more traffic parameters associated with the traversable route, wherein performing the feedback procedure is further based at least in part on the travel time.

27. A non-transitory computer-readable medium storing code for wireless communication at a first user equipment (UE), the code comprising instructions executable by a processor to:
transmit a signal indicating a capability of the first UE of supporting traversable distance calculation;
receive, from a second UE subsequent to the signal indicating the capability of the first UE, a first control signal indicating a range value corresponding to a threshold distance for triggering feedback reporting from the first UE for transmissions from the second UE;
calculate a traversable distance corresponding to a traversable route between the first UE and the second UE;
determine, based at least in part on the calculated traversable distance and the range value, whether the first UE is within the threshold distance for triggering feedback reporting; and
perform, based at least in part on whether the first UE is within the threshold distance, a feedback procedure for the feedback reporting.

* * * * *